United States Patent
Baid

(10) Patent No.: US 7,485,158 B2
(45) Date of Patent: Feb. 3, 2009

(54) METHOD OF DYEING THE TEXTILE ARTICLE FROM MEDICINALLY RICH HERBS

(76) Inventor: Arun M. Baid, 81, Monalisa Apartments, Ambawadi Circle, Ahmedabad-380 006 (IN)

( * ) Notice: Subject to any disclaimer, the term of this patent is extended or adjusted under 35 U.S.C. 154(b) by 0 days.

(21) Appl. No.: 10/542,473

(22) PCT Filed: Jan. 2, 2004

(86) PCT No.: PCT/IN2004/000004

§ 371 (c)(1),
(2), (4) Date: Jun. 26, 2007

(87) PCT Pub. No.: WO2004/072182

PCT Pub. Date: Aug. 26, 2004

(65) Prior Publication Data

US 2007/0240266 A1 Oct. 18, 2007

(30) Foreign Application Priority Data

Jan. 15, 2003 (IN) .......................... 54/MUM/2003

(51) Int. Cl.
*C09B 61/00* (2006.01)
(52) U.S. Cl. ..................... 8/646; 8/101; 8/623; 8/624; 8/625; 8/635; 8/636
(58) Field of Classification Search .............. 8/636, 8/623, 625, 646, 624, 635, 101
See application file for complete search history.

(56) References Cited

U.S. PATENT DOCUMENTS 2,275,845 A * 3/1942 Drake ...................... 106/206.1
5,403,362 A * 4/1995 Gurley ........................... 8/618
5,516,338 A * 5/1996 Pai ................................ 8/596

OTHER PUBLICATIONS

Grae, I. "Nature's Colors: Dyes from Plants", 1974, Macmillan Publishing Co., Inc., New York, pp. 12-14,25,28, 30,32,33,35-36,38,39,40,41,53,58,62-64,125.*
Vankar, P. S. "Chemistry of Natural Dyes", Resonance: journal of science education, Oct. 2000, Indian Academy of Sciences, Bangalore, India, pp. 73-80.*
Balfour, E. "The Cyclopaedia of India and of Easternand Southern Asia", 1885, 3rd. ed., Bernard Quaritch, London, p. 1008.*
Adrosko, R. J. "Natural Dyes and home dyeing", 1971, Dover Publications, New York, pp. 40-41.*
Farooque, M., et al, "Effect of tannins on the color of gur", Journal of Scientific and Industrial Research (1952), 11B, abstract.*
Venkatesh, K. V. L., Shurpalekar, S. R., Prabhakar, J. V., & Amla, B. L. (1970). "Physico-chemical characteristics of papad (Sajji) khar". Journal of Food Science and Technology, 7, pp. 106-109.*

* cited by examiner

Primary Examiner—Lorna M Douyon
Assistant Examiner—Amina Khan
(74) Attorney, Agent, or Firm—Roylance, Abrams, Berdo & Goodman, L.L.P.

(57) ABSTRACT

The novel method relates to dyeing a textile article with medicinally rich herbs to produce natural, unique, deep and fast coloured textile articles having medicinal effects shield the human skin. Successive stages of dyeing include desizing, bleaching, scouring, galling, mordanting, dyeing, washing, colour fixing and finishing. The textile article is pretreated with camel/buffalo/cow dung, Myrobalans and Alum for fixation and development of colour and finally with extract of herbs for dyeing. Salts of copper, chromium, tin and iron can also be use as mordants to modify the shade. In yarn dyeing, drying is done by hanging on a bamboo stick in sunlight and for even penetration of dye yarn is continuously rotated in a dye solution. Novel herbal dyes, methods and cloths made thereof, in chemical free, detergent free, non hazardous, eco friendly, pollution free, having anti-allergic, antiseptic and antimicrobial functions are disclosed.

15 Claims, No Drawings

METHOD OF DYEING THE TEXTILE ARTICLE FROM MEDICINALLY RICH HERBS

TECHNICAL FIELD

The present invention relates to A novel method of dyeing the textile article from medicinally rich herbs.

Ayurveda is renowned for its philosophy and medicinal knowledge since ancient time. Herbs have a great medicinal nature & are a natural form of life. Those vegetable/natural plants, which have medicinal value, are known as "Herb". The term "Natural Dye" refers to dyes obtained from plants, insects and mineral substrates and was used for dyeing textile material. The main natural dye substances used in India have been extracted from the roots, barks, stems, rinds of seeds, flowers and fruits of various dye-producing plants.

Herbal medicinal products and cosmetics are being widely used successfully world wide. Herbs are well known for its medicinal properties, are used to prepare Ayurvedic Medicine, Herbal Beauty Products, Herbal toiletries, etc. Using the herbs for dyeing the textile can epitomized by general trends towards eco friendly dyeing.

With the influx of synthetic dye substitutes for natural dyes in $18^{th}$ & $19^{th}$ century, the natural dye has ceased in most part of the country. This is due to the fact that synthetic dyes were cheaper and the dyeing process was simpler. However in recent days vegetables dyes are being used along with chemical dyes and other chemicals in some of the interior parts of India mainly because of the colour shades it gives and simpler dyeing technique.

It is to be noted that 80% of pollution is connected directly or indirectly with textile. Industry survey from all over the world have revealed that in next 50 years, water & vegetation will become a rare commodity if the rate of pollution continues at the same pace.

Looking at the interest in global market for 100% Natural Textile material in recent years; in which various natural dyes are used to impart colours to textile articles.

BACKGROUND ART

The principal object of this invention is to make not only eco friendly textiles but to impart other medicinal values of herbs along with natural colour of that herbs. Since dyeing is done by not only extracting colour alone from the herbs, but other medicinal ingredients of herbs are also imparted on textile articles with colour. This makes the textile article unique with not only natural colour of herb, but also having other medicinal value of herbs on that textile article.

Practically human body is 24 hrs in contact with some or other textile article in day to day life. Therefore it should be important that textile should not be harmful to human body in any ways.

The present invention comprise of; novel method of dyeing the textile article from medicinally rich herbs is 100% natural and not a single synthetic chemical is used in dyeing the cloth. The principal object of this invention is to make more environment friendly textile material, moreover as the cloths are in touch with human body for 24 hours, it should not be harmful to the human body, not only that but it prevents and also cures number of diseases.

Presently in the textile market, synthetic chemicals are being used to dye the textile articles. In most of the textile Mills for dyeing, the article is processed under Machine; however, at small extent hand-operated dyeing is also adopted. In dyeing process, either the yarn or gray cloth is passed through the different stages. The stages are Desizing, Bleaching, Scouring, Mordanting, Dyeing, Washing, Colour Fixing, Finishing the dyed material. Colours used for dyeing are obtained from synthetic chemicals or from vegetables plants along with chemicals to fix the dye.

Japanese Patent Kokai Publication No. 234988/1990 discloses a dyeing process employing shiitake (a variety of mushroom, cortinellus shitake) which comprises boiling shitake to extract a colour principle, dyeing a fabric with the extract and developing and fixing the colour with a mordant.

Conventional chemical dyeing process developed about 80 years back. About 8000 hazardous chemicals are involved in conventional dyeing process. The tradition of dyeing the textile article with chemicals, was started in Germany & Switzerland, after that slowly it was continuously used world wide. The waste material of dyeing and printing, containing hazardous chemicals is dispatched in environment after finishing the process. Which pollutes the environment and natural resources by polluting soil, water & air. Which may be a source of some Skin related problems, Respiratory diseases, Cancer etc. Universally synthetic chemicals used to impart colours in fabric & yarn may invite harmful causative diseases, due to direct touch of chemicals with skin & directly transmit the same into human body.

In conventional chemical dyeing, the chemical structure constitute amines, amongst which cancer producing 42 amines or chemicals may be present. These cancer producing chemicals (amines) when exposed to the environment, enter into human body via skin, respiration or other transportal route; which may cause Skin Cancer, Throat Cancer, Blood Cancer and many of other Cancer along with skin related diseases.

Chemical dyed cloths are not advisable for Children, Pregnant Woman & Handicap, because it is most allergic to skin, hampers body respiration, is cancerous and Septic. In conventional dyeing process, chemicals used once to dye the cloths are repeatedly used for further dyeing to make colour bright & fast.

Ten years back Eco-friendly and vegetable dyeing process started in market to compete with the Chemical dyeing process. Comparatively it has achieved a remarkable height. Eco-friendly dyeing process is less hazardous & beneficial as compare to conventional chemical dyeing. About 8000 chemicals are still in use for eco friendly dyeing but with restricted parameters. The process is totally machine based and does not harm the natural form of life & environment if followed as per norms. Amines are an important constituent of chemical structure, of which 22 banned cancerous amines excluded from the process. Azo free eco friendly dyeing process is presume to be less hazardous than conventional chemical dyeing. Thus it is Non Allergic, Non Cancerous, does not affect Body Respiration to that extent; hence advisable for Children, Pregnant woman and Allergic patients. However, degradable detergents are used to remove the dirt from cloths before dyeing process.

To overcome these problems the new concept of dyeing the cloths is used to achieve the best results.

DISCLOSURE OF THE INVENTION

The present invention relates to dyeing the textile article with herbs having deep, fast, natural and unique colour. Dyeing the textile article with herbs, the medicinal value of herbs in cloths will remain intact because dyeing is done without chemicals.

A root of concept goes to 4000 years back. In Indian heritage the medicinal value of herbs and dyeing is also mentioned in "Vedas" and "Arthasashtra". The technique was totally lost due to unavailable records. Novel herbal dye is extracted from natural medicinal plants. Herbal dye is used to impart natural colour in cloths. Garments made from the said cloth when comes in direct touch with human skin, it will protect human skin from many diseases by transmitting medicinal value of the herbs to skin and into body by transpiration. Initial Laboratory test have already proved it and moreover, now a days the constant experimental work is in process to overcome other health problems.

The novel method of herbal dyeing to textile article is 100% natural and not a single synthetic chemical involved in dyeing process. In the novel method, there is no use of all banned amines (42 cancer producing chemicals) & detergents; so the dyeing process & herbal wear are totally Azo free. Herbal dyeing is eco friendly and modernized.

The waste of dyeing and printing process containing a herbal dye dispatched in the environment, does not cause any type of pollution in environment, but on the contrary it may be useful as fertilizer and enhance the value of non fertile land.

Using herbs in novel process of dyeing the textile article gives protection against Cancer, Skin disease, Respiratory disease. It is having Antiallergic, Antiseptic and Antimicrobial functions. Herbal wear is advisable to all the age of people, children, handicapped and pregnant woman.

Preparing herbal cloths such as nightwear, fashion wear, Bandages, mask, sportswear, sheeting, undergarments, shirts, etc. helps in curing a number of diseases and shield the human skin by adding medicinal value of herbs to cloths. Herbal dyeing is applied to textile articles like: Raw fiber, Woven fabric, Knitted fabric, Non woven fabric, Stitched garment etc. Since all cotton material are cellulose based; hence wood, paper should be regarded as textile article. Textile article could be only or a blend of Plant fiber and Animal fiber. The raw materials for such textile articles include cotton, silk, wool, etc.

Herbal dyes used to obtain variety of colours either as single ingredient or plural. Natural colours applicable to herbal dyeing include colouring matters available from a large variety of medicinal plants such as: Myrobalans (*Terminalia Chebula*), Alum (*Argilla vitriolutum*), Neem (Indian Lilac), Indigo, Turmeric (*Curcuma longa*), Safflower (*Carthamus tinctorius*), Pomegranate (*Punica granatum*), Brajil wood (*Caesalponia Sappan*), Onion (*Allium cepa*), Potato (*Solanum Tuberosum*), Indian Madder/Madder (*Rubia Cordifolia, Rubia Munjista*), Henna Plant (*Lawsonia inermis, Lalba*), Amaltas (*Cassia Fistuin*), Cateccu (*Unsaria gambir*), Lal Kashish, Saffron (*Crocus Sativas*), MeriGold (*Galendula officinalis*), Lime (Carbonate of Lime), Woad vat, Guar Gum, Peanut oil, Caster oil, Iron scrap, Apple Tree (*Pyrus Malus*), Jaggery, Sandal wood, AAL, Urine (stale), Kachuka Aata, Khar etc.

Medicinal effect derived from several herbs, are described below:
1. Neem: It is effective against cough & breathing problem, leprosy, eyes and skin diseases, kidney diseases, Asthma, Tuberculosis, acidity, Impurities in blood.
2. Indigo: It is effective against stomach related diseases, Heart diseases, kidney diseases, asthma, lung & mental disorders, Tuberculosis, skin diseases. It is antiseptic, antiallergic, insect repellent in nature.
3. Brajil wood: It is effective against acidity, cough, stone disease. It is a Blood purifier.
4. Onion: It is effective against cough, insomnia, acidity, skin & eye disease, Hysteria, Bronchitis, kidney disease.
5. Alum: it is effective against various kidney diseases, cough, plague, E & T problem, mouth ulcer, Asthma, cough, pain in ear, leprosy. It is Anti poisonous & has wound healing properties.
6. Myrobalans: It is effective against anemia, heart diseases, inflammation, stone diseases, breathing problems, perspiration, cough.
7. Pomegranate: It is effective against acidity, heart diseases, Body temperature, cough, throat & mouth inflammation, burning problems.
8. Indian Madder: It is effective against eye disease, paralysis, ear disease, blood impurities, cough, skin disease.
9. Henna: It is effective against eye disease, stone disease, jaundice, blood impurities, skin disease, mouth ulcer.
10. Turmeric: It is effective against cough, skin disease, anemia, acidity, worms in body, liver disease, jaundice, Bronchitis, wound healing.
11. Amaltas: It is effective against heart disease, E & T disease, eye disease, skin disease, constipation, stone disease.
12. Potato: It is effective against acidity, cough.
13. Cateccu: It is effective against pimples, cough, & mouth ulcer.
14. Saffron: It is effective against heart disease, liver disease, leprosy.
15. Marigold: It is effective against inflammation on breasts, cough, asthma, skin disease.
16. Lime: It is effective against constipation, impurities in blood and urine, inflammatory disease; tuberculosis.
17. Apple: It is effective against constipation, cough, rheumatism.
18. Caster Oil: It is having strong insect repellent properties, maintains temperature of the skin, easy in body transpiration.
19. Safflower: It keeps a cholesterol level law, Provides $Ca^{++}$ and Vitamin F.
20. Peanut oil: It keeps nutritional value of the skin intact, provide freshness in the skin, high protein, hinder infections specially Tuberculosis and Hepatitis.
21. Sandal wood: It gives cooling sensation to skin, helps in curing skin itching, insect repellent.
22. Guar Gum: It helps in body transpiration, hinder body infection.
23. Jaggery: It helps in building $Ca^{++}$ and good for bones.
24. AAL: It helps in solving breath related diseases, wound healing, Glucoside and morindin, it is blood purifier.
25. Urine: Provide nourishment to skin and opens pores of skin.
26. Kachuka Aata: Cure inflammation in skin and wounds.
27. Lal Kashish: It is oxidizing agent.
28. Woad Vat: It is effective against stomach related diseases, Heart diseases, kidney diseases, asthma, lung & mental disorders, Tuberculosis, skin diseases.

Extracts of the above mentioned herbs are used as dye. Herbal dyes are extracted directly from herbal plant without use of alkali. The conventional chemical dyeing is not only hazardous but inferior in dye reception.

Herbal dyes are used in printing the textile article. Kachuka Aata or Guar gum are used as adjuvant in printing the textile article.

In the present herbal dyeing process, the cloth and yarn of textile article is passed through different stages: Desizing, Bleaching, Scouring, Galling, Mordanting, dyeing is applied to textile articles like: Raw fiber, Woven fabric, Knitted fabric, Non woven fabric, Stitched garment etc. Since all cotton material are cellulose based; hence wood, paper should be regarded as textile article. Textile article could be only or a blend of Plant fiber and Animal fiber. The raw materials for such textile articles include cotton, silk, wool, etc.

Herbal dyes used to obtain variety of colours either as single ingredient or plural. Natural colours applicable to herbal dyeing include colouring matters available from a large variety of medicinal plants such as: Myrobalans (*Terminalia Chebula*), Alum (*Argilla vitriolutum*), Neem (Indian Lilac), Indigo, Turmeric (*Curcuma longa*), Safflower (*Carthamus tinctorius*), Pomegranate (*Punica granatum*), Brajil wood (*Caesalponia Sappan*), Onion (*Allium cepa*), Potato (*Solanum Tuberosum*), Indian Madder/Madder (*Rubia Cordifolia, Rubia Munjista*), Henna Plant (*Lawsonia inermis, Lalba*), Amaltas (*Cassia Fistuin*), Cateccu (*Unsaria gambir*), Lal Kashish, Saffron (*Crocus Sativus*), MeriGold (*Galendula officinalis*), Lime (Carbonate of Lime), Woad vat, Guar Gum, Peanut oil, Caster oil, Iron scrap, Apple Tree (*Pyrus Malus*), Jaggery, Sandal wood, AAL, Urine (stale), Kachuka Aata, Khar etc.

Medicinal effect derived from several herbs, are described below:
1. Neem: It is effective against cough & breathing problem, leprosy, eyes and skin diseases, kidney diseases, Asthma, Tuberculosis, acidity, Impurities in blood.
2. Indigo: It is effective against stomach related diseases, Heart diseases, kidney diseases, asthma, lung & mental disorders, Tuberculosis, skin diseases. It is antiseptic, anti-allergic, insect repellent in nature.
3. Brajil Wood: It is effective against acidity, cough, stone disease. It is a Blood purifier. above constituents in solution.
3. Formulation of Herbal Blues: (Indigo Vat)
5% to 10% of Indigo extract/wt of fabric and
Lime &
Urine (stale) &
Jaggery Besides blue, various other shades are obtained by varying the properties of the above constituents in solution.
4. Formulation of Herbal Orange:
50-100% of Safflower/wt. of fabric. Or
50-100% of Madder/wt. of fabric. Or
50-100% of Mari gold/wt of fabric
5. Formulation of Herbal Green:
50-100% Pomegranate Rind/wt. of fabric along with Indigo Vat
Neem leaves
50-100% of Amaltas/wt of fabric
20-50% Turmeric/wt of fabric with Indigo Vat.
6. Formulation of Herbal Browns:
50%-100% of Cateccu/wt. of fabric Or
50%-100% of Madder/wt. of fabric and Lal Kashish Or
Henna
7. Formulation of Herbal Black:
Iron scrap
Jaggery
Oil (Peanut, Caster oil)

By combination of Blue, Red & Yellow colours, various other colours are obtained. For preparation of various colours, number of herbs are used. For preparation of various shades of colours, percentage of herbal constituents are varied.

Preparation for Plant & Animal Cloth Dyeing (Cotton, Silk, Wool):

Gray cloth is passed through various stages for herbal dyeing.

Stage 1 Desizing:

Gray cloth is boiled for 1 Hour in solution of Sea salt/Khar salt (*Desi Papad, Suji*) having natural minerals. Cloth is dipped in the solution for 12 hrs-24 hrs. After squeezing the cloth, washed it with clear water by thrashing on stone, then it was kept for drying in sunlight.

Gray cloth is passed through this process for removing the sizing, gums, oils, impurities and stains on it, which makes the cloth more absorbent for the herbals. In the said washing of gray cloth detergent is not involved.

Stage 2 Bleaching & Scouring

The dried cloth is now spreaded on grass & kept open in sunlight for 2-3 days. Water is sprinkled over it constantly at shorter intervals. Reaction between sun and grass makes the cloth bleach to great extent.

The cloth is now soaked in solution of either camel/buffalo/cow/sheep dung. The cloth is kept immerse for 12 hours in the said solution. Again the cloth is kept open for drying in sun for 4-5 hours. Constantly water is sprinkled over it at the shorter interval. The process is continued for 3-5 days, till required whiteness and softness in cloth is achieved. Camel/Buffalo/Cow/Sheep dung is used for both scouring & bleaching the gray cloth.

Stage 3 Galling/Mordanting:

This is the process of giving fast and bright colours on textile article. Before preparing a cloth for dyeing, the cloth is passed through Mordanting treatment using tannic acid. Mordanting is performed before dyeing. Here, Myrobalams is a natural source (herb) of Tannin which can be used alone or with aluminum potassium sulfate (Alum salt), a natural source (herb) for mordanting. In the sense Myrobalans and Alum salt are used for colour development and colour fixing properties. Both can be used separately or together as per requirement of shade of colour.

Galling: Gray cloth is well soaked in solution of Myrobalans (harde) for some time. Myrobalans solution is prepared in water by taking 30% Myrobalans/wt. of fabric, Kept open the cloth for drying in sun. After drying the same process is repeated for at least 2-3 times. The cloth gets a yellowish tint after this stage. This is also an process for mordanting by use of natural tennin.

Mordanting: The gray cloth is now mordanated by dipping it in solution of Alum salt (7%-25% of Alum/wt. of fabric). Alumina is a substance of Alum salt. Alum salt is used as mordant for the fixation of dye on cloth. After this, gray cloth was ready for dyeing. Other mordants like: Iron salts, Copper salts, Chromium salts, Tin salts, etc. are available from natural resources can also be used over & above the Alum salts for modifying the shade of dye produced. Iron & Copper vat is made from natural source as Jaggery, oil, copper & iron rich sources. Grass and Tea are natural source of Alum Salt.

Stage 4 Dyeing:

After mordanting gray cloth when ready after above stated process, is boil at about 80° C. to 100° C. for 45 min-180 min in the solution of herbal dye of our desired colour, until the colour is fully absorbed.

Preparing Dye Solution from the Extract of Herbs

Dye is extracted from the herbs by soaking herbs in water (quantity of water about 15 to 20 times than wt of the herbs) and boiled at 90° C. for 1.5 hrs-2 hrs. The solution is kept for overnight. The solution is strained through cloth to avoid unwanted dyes & bigger particles of herbs and other unwanted dust particles. Now the strained solution is ready as herbal dye solution. In preparing dye solution of turmeric the method is same as above but the temperature should be maintained at 60° C.

Stage 5 Washing:

Now the dyed cloth is washed in running water (river water or Artificial) to remove unattached dye.

Stage 6 Colour Fixation:

Some time after Myrobalans treatment textile is also dipped in cold solution of required herbs.

Now after giving a wash, the dyed cloth is kept for boiling in solution of "Dhavdi/Jajaku leaves" for 45 min-90 min. This step is used to fix the colour of dye on cloth and increase the depth of colour without using any synthetic chemicals. Further dyed cloth is washed and kept open in sun for drying.

Stage 7 Finishing:

Finally the dyed cloth is passed under finishing. In which the dyed cloth is kept in rice paste or sugar to give stiffness and shine.

Now the dyed cloth is ready. Each and every step of dyeing the silk and wool cloth is similar to cotton cloth. However; the care should be taken in case of animal fiber, not over boil the dyeing solution, as too much heating harms the quality of animal fibers Herbal cloths are prepared by using a novel herbal dye and method of dyeing the textile article thereof, are experimented on skin Allergic patients to check the effectiveness and positive results were found.

Preparation for Plant & Animal Yarn Dyeing (Cotton, Silk, Wool):

A process of preparing yarn for herbal dyeing is nearly similar to that in dyeing a cloth, is adopted when yarn is dyed a fast red or any colour in combination with red. For other colours such as black, blue, yellow and green the yarn is merely washed in cold water to remove the size/starch. Through the process of yarn dyeing, drying of yarn is done by hanging the yarn on wooden stick.

Only difference between dyeing cloth and yarn is that, yarn is in form of Hanks and dyed by rotating the same in herbal solution to give even penetration. For drying the yarn, it is hanged on a wooden stick of about 2-2.5 feet open to sunlight, after which all further process is possible. While in cloth dyeing, the drying process is different.

Stage 1 Desizing:

Yarn is boiled for 1 Hour in solution of Sea salt/Khar salt (*desi Papad, Suji*) having natural minerals. Yarn is dipped in solution for 12 hrs-24 hrs. After Trumpling the yarn with hands or legs, washed it with clear water by thrashing on stone. Then it was kept for drying in sunlight by hanging upon Bamboo stick.

Yarn is passed through this process for removing the sizing, gums, oils, impurities and stains on it, which makes the yarn more absorbent for the herbals. In the said washing of yarn detergent is not involved.

Stage 2 Bleaching & Scouring

The dried yarn is now kept open in sunlight for 2-3 days by hanging on Bamboo stick. Water is sprinkled over it constantly at shorter intervals.

The yarn is now soaked in solution of either camel/buffalo/cow/sheep dung. The yarn is kept immerse for 12 hours in the said solution. Again the yarn is kept open in sun for drying, by hanging upon Bamboo stick for 4-5 hours. Constantly water is sprinkled over it at the shorter interval. The process is continued for 3-5 days, till required whiteness and softness in yarn is achieved. Camel/Buffalo/Cow/Sheep dung is used for both scouring and bleaching the yarn.

Stage 3 Galling/Mordanting:

This is the process of giving fast & bright colours on textile article. Before preparing a yarn for dyeing, the yarn is passed through tannic acid (tannin) treatment and mordanting. Mordanting is performed before dyeing. Here, Myrobalans is a natural source (herb) of Tannin which can be used alone or with Alum salt, a natural source (herb) for mordanting. In the sense Myrobalans and Alum salt are used for colour development and color fixing properties. Both can be used separately or together as per requirement of shade of colour.

Galling: Yarn is well soaked in solution of Myrobalans (harde) for some time. Myrobalans solution is prepared in water by taking 30% Myrobalans/wt of yarn, Kept the yarn open for drying in sun by hanging upon Bamboo stick. After drying, the same process is repeated for at least 2-3 times. The yarn get a yellowish tint after this stage. This is also an process for mordanting by use of natural tennin.

Mordanting: Yarn is dipped in solution of Alum salt (7%-25% of Alum/wt. of fabric). Alumina is a substance of Alum salt. Alum salt is used as mordant for the fixation of dye on yarn. After this, yarn was ready for red dyeing. Other mordants like: Iron salts, Copper salts, Chromium salts, Tin salts, etc. are available from natural resources can also be used over & above the Alum salts for modifying the shade of dye produced. Iron is used as a mordant for the fixation of colours for Violet. Iron & copper vat is made from natural source as Jaggery, oil, copper & iron rich sources. Grass and Tea are natural source of Alum salt.

Stage 4 Dyeing:

After mordanting the yarn when ready after above stated process, is boil at about 80° C. to 100° C. for 45 min-180 min in the solution of herbal dye of our desired colour, until the colour is fully absorbed. During boiling keep on rotating the yarn in herbal solution for even colour penetration.

Preparing Dye Solution from the Extract of Herbs:

Dye is extracted from the herbs by soaking herbs in water (quantity of water about 15 to 20 times than wt of herbs) and boiled at 90° C. for 1.5 hrs-2 hrs. The solution is kept for overnight. It is strained through cloth to avoid unwanted dyes & bigger particles of herbs and other unwanted dust particles. Now the strained solution is ready as herbal dye solution. In preparing dye solution of turmeric the method is same as above but the temperature should be maintained at 60° C.

Stage 5 Washing:

Now the dyed yarn is washed in running water (river water or artificial) to remove unattached dye.

Stage 6 Colour Fixation:

Some time after Myrobalans treatment textile is also dipped in cold solution of required herbs.

Now after giving a wash, the dyed yarn is kept for boiling in solution of "Dhavdi/Jajaku leaves" for 45 min-90 min. This step is used to fix the colour of dye on yarn and increase the depth of colour without using any synthetic chemicals. Further dyed yarn is washed and kept open in sun by hanging upon Bamboo stick for drying.

Stage 7 Finishing:

Finally the dyed yarn is passed under finishing. In which the dyed yarn is kept in rice paste or sugar to give stiffness and shine.

Now the dyed yarn is ready. Each and every step of dyeing the silk and wool yarn is similar to cotton yarn. However; the care should be taken in case of animal fiber, not over boil the dyeing solution, as too much heating harms the quality of animal fibers.

Thus in accordance with the invention, now the textile articles are successfully dyed with herbs, good dyeing affinity is obtained; with natural, unique and fast colour to cloths in addition helps to cure a number of diseases & shield the human skin by adding medicinal value of herbs to cloths. Which was not possible since so far, with the conventional chemical dyeing to textile article. The herbal wear meets the consumer's demand for natural, trendy & fashionable cloths and aspiration for health.

All process related to herbal dying to textile article till now is more of a hand-operated process.

Machines related to herbal dyeing are as following:
a. drum dyeing unit
b. Dryers
c. Calender/Zero-Zero
d. Stanter
e. Edger Machine
f. Jet dyeing Machine
g. Yarn Hank dyeing Machine
h. Jigger Machine
i. Screen Printing Machine
j. Power Loom for weaving of dyed yarn.

The invention claimed is:

1. A method of dyeing the textile article from medicinally rich herbs
   comprising the steps of:
   (a) desizing the textile article by boiling it in sea salt and khar salt;
   (b) scouring the textile article;
   (c) bleaching the textile article in bleaching solution for at least 12 hours and drying in natural light;
   (d) mordanting the article using Myrobalans and natural salts of metal selected from either aluminum, iron, copper, chromium or tin;
   (e) dyeing the article, using herbs;
   (f) washing the dyed textile article;
   (g) boiling the textile article in a solution containing Dhavdi and Jajaku leaves thereby fixing dye on the textile article, and
   (h) finishing the dyed article.

2. A method of herbal dyeing the textile article as claimed in claim 1, wherein the textile article is desized by boiling it in the solution of sea salt and khar salt for 1 hour and immersed in said sea salt and khar salt solution for 12-24 hrs, squeezing and washing to remove sea and khar salt from the textile article.

3. A method of herbal dyeing the textile article as claimed in claim 1, wherein step (b) is preceeded by a step of pre-bleaching for a duration of approximately 2-3 days.

4. A method of herbal dyeing the textile article as claimed in claim 1, wherein in step (d) the textile article is soaked in a solution comprising 30% extract of Myrobalans and 7%-25% extract of aluminum potassium sulfate per weight of fabric.

5. A method of herbal dyeing the textile article as claimed in claim 1, wherein the textile article is boiled at 80° C. to 100° C. for 45 min-180 min in a solution containing a medicinally rich coloring herb.

6. A method of herbal dyeing the textile article as claimed in claim 1, wherein in step (g) the color of the dye is fixed by boiling for 45-80 minutes.

7. A method of herbal dyeing the textile article as claimed in claim 1, wherein the dyed textile article is finished with a solution comprising rice paste or sugar.

8. A method of herbal dyeing the textile article as claimed in claim 1, wherein said article is dyed red by contact with an extract comprising herb safflower or Madder root.

9. A method of herbal dyeing the textile article as claimed in claim 1, wherein said article is dyed blue by contact with a mixture comprising extract of indigo, extract of lime, and extract of jaggery.

10. A method of herbal dyeing the textile article as claimed in claim 1, wherein said article is dyed yellow by contact with a solution comprising extract of pomegranate rind, extract of turmeric and/or extract of marigold.

11. A method of herbal dyeing the textile article as claimed in claim 1, wherein said article is dyed orange by contact with a solution comprising extract of safflower, extract of Madder root and/or extract of Marigold.

12. A method of herbal dyeing the textile article as claimed in claim 1, wherein said article is dyed green by contact with a solution comprising extract of Pomegranate, indigo vat, extract of neem leaves, extract of Amaltas, and/or extract of turmeric.

13. A method of herbal dyeing the textile article as claimed in claim 1, wherein said article is dyed brown by contact with a solution comprising, extract of madder and/or extract of henna.

14. A novel method of herbal dyeing the textile article as claimed in claim 1, wherein said article is dyed black by contact with a fermented solution comprising extract of iron scrap, extract of jaggery, extract of peanut oil and/or castor oil.

15. A method of herbal dyeing the textile article as claimed in claim 1, wherein in step (c) said drying of the textile article is done in presence of sun light for at least 5 hours with sprinkling away the water on the textile article during said drying and repeating for 5 days.

* * * * *